(12) United States Patent
Lee et al.

(10) Patent No.: US 12,509,541 B2
(45) Date of Patent: Dec. 30, 2025

(54) HYDROGENATED PETROLEUM RESIN AND RUBBER COMPOSITION COMPRISING SAME

(71) Applicant: KOLON INDUSTRIES, INC., Seoul (KR)

(72) Inventors: Sang Hyun Lee, Seoul (KR); Min Sik Cho, Seoul (KR); Su Yeoun Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 595 days.

(21) Appl. No.: 17/635,028

(22) PCT Filed: Dec. 17, 2020

(86) PCT No.: PCT/KR2020/018566
§ 371 (c)(1),
(2) Date: Feb. 14, 2022

(87) PCT Pub. No.: WO2021/125837
PCT Pub. Date: Jun. 24, 2021

(65) Prior Publication Data
US 2022/0220243 A1    Jul. 14, 2022

(30) Foreign Application Priority Data

Dec. 17, 2019  (KR) .......................... 10-2019-0168439

(51) Int. Cl.
*C08F 236/10* (2006.01)
*B60C 1/00* (2006.01)
*C08F 8/04* (2006.01)

(52) U.S. Cl.
CPC .......... *C08F 236/10* (2013.01); *B60C 1/0016* (2013.01); *C08F 8/04* (2013.01); *C08F 2800/20* (2013.01)

(58) Field of Classification Search
CPC ........ C08F 236/10; C08F 8/04; C08F 236/20; B60C 1/0016
See application file for complete search history.

(56) References Cited

U.S. PATENT DOCUMENTS

| | | | |
|---|---|---|---|
| 3,554,940 A * | 1/1971 | Arakawa ................ | C09J 165/00 524/274 |
| 4,927,885 A * | 5/1990 | Hayashida ................ | C08J 5/18 525/196 |
| 5,082,900 A * | 1/1992 | Kuroda ................ | C08L 23/10 524/518 |
| 5,171,793 A | 12/1992 | Johnson | |
| 2003/0105240 A1* | 6/2003 | Hikosaka ................ | C08L 25/02 525/241 |
| 2006/0223948 A1* | 10/2006 | Yamane ................ | C09J 125/08 525/333.3 |

FOREIGN PATENT DOCUMENTS

| | | |
|---|---|---|
| CN | 1277620 A | 12/2000 |
| CN | 1720272 A | 1/2006 |
| CN | 103319660 A | 9/2013 |
| CN | 106268725 A | 1/2017 |
| CN | 106967197 A | 7/2017 |
| CN | 107778389 A | 3/2018 |
| CN | 107922552 A | 4/2018 |
| EP | 1 568 722 A1 | 8/2005 |
| EP | 1574526 A1 | 9/2005 |
| JP | H05-504592 A | 7/1993 |
| JP | H08-208763 A | 8/1996 |
| JP | 11-130820 A | 5/1999 |
| JP | 2019006880 A | 1/2019 |
| KR | 100227566 B1 | 8/1999 |
| KR | 101572106 B1 | 11/2015 |
| KR | 1020160002044 A | 1/2016 |
| KR | 1020160138391 A | 12/2016 |
| KR | 10-2017-0003425 A | 1/2017 |
| KR | 1020170038404 A | 4/2017 |
| KR | 101937500 B1 | 1/2019 |
| KR | 1020190017229 A | 2/2019 |
| KR | 102155698 B1 | 9/2020 |
| WO | 2018/101365 A1 | 6/2018 |

(Continued)

OTHER PUBLICATIONS

Extended European Search Report dated Jul. 10, 2023.
KR Office Action dated Mar. 16, 2020.
KR Notice of Allowance dated Jul. 2, 2020.
International Search Report dated Apr. 1, 2021.
CN Office Action dated Aug. 19, 2022.
JP Office Action.
CN Office Action dated Jan. 21, 2025.
D7_JIS K 2207-1996.
D9_ISO 3839:1978.
Notice of opposition dated Jul. 11, 2025.

*Primary Examiner* — Robert C Boyle
(74) *Attorney, Agent, or Firm* — Harvest IP Law, LLP

(57) ABSTRACT

The present disclosure relates to a hydrogenated petroleum resin and a rubber composition including the same. The hydrogenated petroleum resin according to the present disclosure not only improves the viscoelastic properties of rubber containing the same, but also has excellent compatibility with rubber, thereby improving the overall physical properties of the rubber. Thus, rubber molded articles manufactured from the rubber composition containing the hydrogenated petroleum resin, for example, tires, have improved grip strength (wet/dry) and reduce an increase in rolling resistance due to the improvement in grip force to simultaneously satisfy two properties of grip force and rolling resistance required as a tire, thereby manufacturing a low-fuel consumption and high-performance tire.

18 Claims, No Drawings

(56) References Cited

FOREIGN PATENT DOCUMENTS

WO 2019/207925 A1 10/2019

\* cited by examiner

HYDROGENATED PETROLEUM RESIN AND RUBBER COMPOSITION COMPRISING SAME

CROSS REFERENCE TO RELATED APPLICATIONS

This application is a National Stage of International Application No. PCT/KR2020/018566 filed Dec. 17, 2020, claiming priority based on Korean Patent Application No. 10-2019-0168439 filed Dec. 17, 2019.

TECHNICAL FIELD

The present disclosure relates to a hydrogenated petroleum resin and a rubber composition including the same.

DESCRIPTION OF RELATED ART

A tire supports the load of a vehicle, mitigates the impact generated on a road surface, and transmits the power of the vehicle engine, braking force, or the like to the road surface to maintain the movement of the vehicle. Tires for vehicles require various characteristics such as durability, wear resistance, rolling resistance, fuel economy, steering stability, ride comfort, braking, vibration, and noise.

Recently, as vehicles have become more advanced and safety requirements have increased, there is a need to develop high-performance tires capable of maintaining optimal performance on various road surfaces and in various climates. In line with these needs, a tire energy consumption efficiency rating system was introduced.

In the tire energy consumption efficiency rating system, the performance of both fuel economy (efficiency) and safety are graded and provided. In this case, it is evaluated that the lower the rolling resistance of the tire, the better the fuel economy performance, and the higher the braking force on a wet road surface, the better the safety.

Fuel efficiency is measured based on rolling resistance (RR), and refers to a resistance that occurs while a round object such as a tire moves in a straight line with a constant speed on a plane.

Wet road surface braking force (wet grip) refers to braking performance, which is tire performance related to safety. Here, excellent grip refers to good braking performance at the time of cornering and stopping due to high adhesion between the tire and the road surface. Recently, among vehicle evaluation items, a vehicle's braking distance is emerging as a major evaluation item. Further, vehicle users also have high awareness of safety as they frequently encounter information regarding vehicle accidents, and thus have a lot of interest in the braking performance of vehicles.

As already mentioned, grip force is a technology that allows a tire surface to adhere well to the road surface, and it is advantageous if the tire has excellent elasticity. However, considering grip force together with rolling resistance, the rolling resistance is advantageous as adhesion to the road surface decreases, and thus rolling resistance and grip force of the tire have opposite characteristics.

That is, a tire having low rolling resistance is advantageous in fuel efficiency, but adhesion to a road may be weak when the road is wet. Accordingly, the recent development of tires is progressing in a way that tries to control both rolling resistance and grip force, rather than a one-dimensional method of lowering rolling resistance or increasing grip force.

PRIOR ART DOCUMENTS

Patent Documents (Patent Document 1) Korean Patent Registration No. 10-0227566 (1999 Aug. 4)
(Patent Document 2) Korean Patent Registration No. 10-1572106 (2015 Nov. 20)
(Patent Document 3) Korean Patent Application Publication No. 2016-0002044 (2016 Jan. 7)

CONTENT OF DISCLOSURE

Technical Problem

Accordingly, a technical problem to be solved by the present disclosure is to provide a petroleum resin for tires having fuel efficiency and braking stability by improving grip force and minimizing a decrease in rolling resistance, and a tire tread manufactured using the same.

Solution to Problem

An aspect of the present disclosure is to provide a hydrogenated petroleum resin including a repeating unit (A) derived from a cyclic pentadiene component; and a repeating unit (B) derived from a $C_9$ fraction.

$$0.610 < \frac{x^2}{a} + \frac{y^2}{b} + \frac{z^2}{c} < 1.004 \qquad \text{[Equation 1]}$$

in Equation 1,
x is a softening point (° C.),
y is an aromatic hydrogen content (mol %),
z is a bromine value, and
a=25600, b=625, and c=2500.

Another aspect of the present disclosure is to provide a rubber composition including the hydrogenated petroleum resin.

Another aspect of the present disclosure is to provide a rubber composition for tire treads, including the hydrogenated petroleum resin.

Advantageous Effects of Disclosure

The hydrogenated petroleum resin according to the present disclosure not only improves the viscoelastic properties of rubber containing the same, but also has excellent compatibility with rubber, thereby improving the overall physical properties of the rubber.

Thus, rubber molded articles manufactured from the rubber composition containing the hydrogenated petroleum resin, for example, tires, have improved grip force (wet/dry) and reduce an increase in rolling resistance due to the improvement in grip force to simultaneously satisfy two properties of grip force and rolling resistance required as a tire, thereby manufacturing a low-fuel consumption and high-performance tire.

DETAILED DESCRIPTION

Hereinafter, various aspects and various embodiments of the present disclosure will be described in more detail.

The terms or words used in the specification and claims should not be construed as being limited to their usual or dictionary meanings. The invention should be interpreted as meanings and concepts consistent with the technical idea of the present disclosure on the basis of the principle that the concept of terms can be appropriately defined in order to describe its own invention by the inventor in the best way.

The terminology used in the present disclosure is for the purpose of describing particular embodiments only and is not intended to restrict the present disclosure. The singular form includes a plural form unless contents are clearly indicated otherwise. It will be further understood that the terms "comprise" and/or "have," when used in the present disclosure, specify the presence of stated features, integers, steps, operations, elements, and/or components, but do not preclude the presence or addition of one or more other features, integers, steps, operations, elements, components, and/or groups thereof.

The term "grip force" used in the present disclosure includes both wet grip force and dry grip force. In this case, the wet grip force refers to grip performance on a wet road surface state due to snow or rain, and the dry grip force refers to grip performance on a general road surface state. The excellent grip force means that adhesion force between a tire and a road surface is high, and thus braking performance is good during cornering or stopping.

The term 'rolling resistance' used in the present disclosure refers to a ratio of rolling resistance to a load applied to a tire. In the present disclosure, the excellent rolling resistance characteristics mean that energy loss of the tire itself or energy loss between the tire and the road surface is small, or an increase in rolling resistance is small.

The term "aromatic hydrogen" used in the present disclosure refers to a hydrogen atom directly connected to an aromatic ring, may be measured by $^1$H-nuclearmagneticresonance ($^1$H-NMR), and may be used to determine aromaticity of a resin.

The rubber constituting a tire rubs against a road surface as it rotates, and it periodically repeats its deformation and recovery due to its elasticity. At this time, energy during deformation is not completely recovered due to the viscosity of the rubber, and a part of the energy is consumed as thermal energy. In this case, the consumed thermal energy is called hysteresis loss, and a large loss is expressed as a high hysteresis. As already mentioned, the excellent grip force means that adhesion force between the tire and the road surface is high, so braking performance is excellent during cornering or braking. However, the rubber composition has high hysteresis, so that it absorbs deformation energy received from the outside and consumes a lot of heat energy. As thermal energy is consumed, the conversion rate into a driving force decreases, and rolling resistance increases.

Accordingly, the tire has excellent fuel economy by minimizing thermal energy loss during driving and has low rolling resistance to suppress heat generation, and sliding resistance is greatly reduced as the speed of the vehicle increases on a wet road surface compared to a dry road surface so that the tire must have excellent viscoelastic properties that affect dynamic properties, such as high grip force, for the purpose of braking performance and driving stability. However, grip force and rolling resistance are opposite factor to each other, and when the grip force increases, the rolling resistance also increases, thereby causing a problem of increasing fuel consumption. That is, controlling both grip force and rolling resistance is a task for improving tire performance.

Thus, the present disclosure provides an excellent hydrogenated petroleum resin having both low rolling resistance and high grip force.

Specifically, an aspect of the present disclosure provides a hydrogenated petroleum resin including: a repeating unit (A) derived from a cyclic pentadiene component; and a repeating unit (B) derived from a $C_9$ fraction, wherein the hydrogenated petroleum resin satisfies Equation 1.

$$0.610 < \frac{x^2}{a} + \frac{y^2}{b} + \frac{z^2}{c} < 1.004 \qquad \text{[Equation 1]}$$

In Equation 1, x is a softening point (° C.), y is an aromatic hydrogen content (mol %), z is a bromine value, and a=25600, b=625, and c=2500.

The hydrogenated petroleum resin may be prepared through a hydrogenation reaction after two kinds of repeating units are prepared into a copolymer by copolymerization as shown in Formula 1 below.

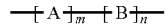

[Formula 1]

In Formula 1, A is a repeating unit (A) derived from a cyclic pentadiene component, B is a repeating unit (B) derived from a $C_9$ fraction, and m and n are molar ratios of the repeating units, respectively, and m+n=100 is satisfied.

Here, the form of the copolymer is expressed as above for convenience, but is not particularly limited, and the copolymer may have various forms such as random copolymers, alternate copolymers, block copolymers, graft copolymers and starblock copolymers. Preferably, the copolymer may be a random copolymer.

The copolymer may further include an additional repeating unit in addition to the above-described repeating units.

Hereinafter, each repeating unit will be described in detail.

The cyclic pentadiene component, which is an aliphatic cyclic monomer obtained from naphtha cracking, includes two or more ethylenically unsaturated groups which are polymerizable functional groups on a basic skeleton of a pentagonal ring structure, and may include at least one selected from cyclopentadiene, dicyclopentadiene, and dimethyl cyclopentadiene.

The $C_9$ fraction refers to a mixture of hydrocarbons each having 8 or more carbon atoms, and includes at least one selected from unsaturated aromatic $C_8$, $C_9$, and $C_{10}$ fractions boiling at 100° C. to 300° C. under atmospheric pressure. The $C_9$ fraction is co-polymerized with the above-described cyclic pentadiene.

The $C_9$ fraction may include styrene, vinyl toluene, indene, α-methyl styrene, and benzene/toluene/xylene (BTX). Here, the benzene/toluene/xylene (BTX) is a mixture of benzene, toluene, o-xylene, m-xylene, and p-xylene. For example, the $C_9$ fraction may include 10 wt % to 20 wt % of styrene, 10 wt % to 20 wt % of vinyl toluene, 10 wt % to 20 wt % of indene, 1 wt % to 7 wt % of α-methyl styrene, and 40 wt % to 60 wt % of BTX, based on the total weight of the $C_9$ fraction. Preferably, the $C_9$ fraction may be a mixed fraction including 10 wt % to 30 wt % of styrene, 10 wt % to 20 wt % of indene, 1 wt % to 7 wt % of α-methyl styrene, and 50 wt % to 80 wt % of BTX, based on the total weight of the $C_9$ fraction.

When the hydrogenated petroleum resin includes the repeating units A and B and the physical properties, such as softening point, aromatic hydrogen content, and bromine value, satisfy Equation 1, it was found that the viscoelastic properties of the rubber obtained by introducing the hydrogenated petroleum resin into the rubber composition may be appropriately adjusted to minimize an increase of rolling resistance together with an overall improvement effect whiling maintaining a balance of grip force on a wet road surface and a normal road surface, thereby simultaneously improving braking performance and fuel efficiency.

More specifically, when the hydrogenated petroleum resin satisfies Equation 1 above, it was found that, among the loss coefficients of the prepared rubber composition measured at 11 Hz, grip force, especially, the loss coefficient tan $\delta(0°\ C.)$ related to a wet road surface braking force (wet grip force) has a large value, and an increase of the loss coefficient tan $\delta(70°\ C.)$ related to rolling resistance is minimized. In contrast, when the hydrogenated petroleum resin is out of the range of Equation 1, based on the range of Equation 1, the tan $\delta$ (0° C.) value, that is, the wet road surface braking force was rapidly decreased, and the tan $\delta$ (70° C.) value related to rolling resistance had a value similar to that of the petroleum resin belonging to the range of Equation 1 above.

Further, when the hydrogenated petroleum resin satisfies Equation 1 above, the tan $\delta$ (0° C.) value also tends to increase in proportional to an increase in the calculated value according to Equation 1, but when the hydrogenated petroleum resin is out of the range of Equation 1, the tan $\delta$ (0° C.) value decreases in inverse proportion to an increase in the calculated value according to Equation 1.

According to a preferred embodiment, the hydrogenated petroleum resin may satisfy Equation 2 below while satisfying Equation 1 above.

$$150 \le x + 3y \le 175 \quad \text{[Equation 2]}$$

In Equation 2, x is a softening point (° C.), and y is an aromatic hydrogen content (mol %).

In the case of the hydrogenated petroleum resin further satisfying Equation 2, it may be found that the loss coefficient tan $\delta$ (0° C.) of the prepared rubber composition related to the wet road surface braking force has a value of 110% or higher compared to the tan $\delta$ (70° C.) value thereof related to the rolling resistance.

According to the most preferred embodiment, the hydrogenated petroleum resin may satisfy Equation 1-1 below while satisfying Equations 1 and 2 above.

$$0.920 < \frac{x^2}{a} + \frac{y^2}{b} + \frac{z^2}{c} < 1.004 \quad \text{[Equation 1-1]}$$

In Equation 1-1, x is a softening point (° C.), y is an aromatic hydrogen content (mol %), z is a bromine value, and a=25600, b=625, and c=2500.

The hydrogenated petroleum resin further satisfying Equation 1-1 retains the characteristics of the hydrogenated petroleum resin satisfying Equation 1 and Equation 2 above, and has the best loss coefficient value related to a braking force, especially, a wet road surface braking force.

The softening point refers to a temperature at which the hydrogenated petroleum resin is deformed by heat to be softened. Regardless of Equation 1 above, the softening point may be preferably 100° C. to 150° C., more preferably 110° C. to 120° C. When the softening point is less than the above range, there may be a problem that the petroleum resin itself is fused during the storage of the petroleum resin. In contrast, when the softening point is more than the above range, there may be a problem of deteriorating viscoelastic properties.

The ratio of aromatic hydrogen may be evaluated through peak analysis obtained by 1H-NMR measurement, and is based on the total number of moles of hydrogen contained in the resin.

1H-NMR analysis is an analysis method that observes which atom is bonded to the hydrogen atom in the compound, which functional group includes the hydrogen atom in the compound, or what spatial arrangement is like. This method is a method used for identification and identification of compounds, and may be used for quantitative analysis of mixtures and estimation of molecular structure, as well as measurement of changes in binding state.

In $^1$H-NMR spectrum, protons (H$^+$) having the same relationship in the molecule appear as one peak, and if there is an influence with another adjacent nucleus each other, they divide and appear as multiple lines. In this case, the position of chemical shift (that is, frequency interval, ppm) of the peak differs according to the type of present proton, and the intensity thereof also appears differently. That is, it is possible to extract information on what kind of protons exist in a molecule through chemical shift data, in what proportion each proton exists through intensity (integral), and which protons are adjacent to each other through coupling.

The hydrogenated petroleum resin presented in the present disclosure includes repeating units (A) and (B), and in this case, an aliphatic ring structure derived from the cyclic pentadiene component and an aromatic ring structure derived from the $C_9$ fraction exist simultaneously. As a result, it is possible to specify the petroleum resin by identifying a hydrogen atom directly bonded to the aromatic ring structure corresponding to the repeating unit (B) derived from the $C_9$ fraction, that is, the peak corresponding to the aromatic hydrogen.

Assuming that the $^1$H-NMR spectrum of the hydrogenated petroleum resin of the present disclosure is measured to 0.0 ppm to 9.0 ppm, in order to confirm the existence of the repeating unit (B) derived from the $C_9$ fraction in the hydrogenated petroleum resin presented in the present disclosure, it is very important to analyze the peak in the range of 6.5 to 8.0 ppm corresponding to aromatic hydrogen. In general, peak analysis is divided into a case where a peak area is used as a parameter and a case where a peak width is used as a parameter. That is, quantitative analysis and qualitative analysis are possible by analyzing the parameters related to the peak area and the width of the peak, so that the hydrogenated petroleum resin presented in the present disclosure may be specified.

The hydrogenated petroleum resin of the present disclosure may be limited to a parameter of the peak area in a range corresponding to aromatic hydrogen. Specifically, since the peak related to aromatic hydrogen appears in the range of 6.5 ppm to 8.0 ppm, the content of aromatic hydrogen in the petroleum resin may be estimated by measuring the area of the peak in the corresponding range obtained after 1H-NMR measurement and calculating the ratio of the peak area in the corresponding range to the total peak area. In this case, the total peak area refers to the total number of moles of hydrogen contained in the petroleum resin.

The hydrogenated petroleum resin may include aromatic hydrogen in an amount of preferably 6.0 mol % to 14.0 mol %, more preferably 8.0 mol % to 14.0 mol %, and most preferably 8.0 mol % to 12.0 mol %, based on total number of moles of hydrogen in the resin. When the content of aromatic hydrogen is less than the range of 6.0 mol % to 14.0 mol %, sufficient compatibility with the rubber composition is not secured, and thus the effect of improving grip force and rolling resistance cannot be obtained. On the contrary, when the content thereof exceeds the above range, compatibility may be deteriorated due to an increasing molecular weight, and there may be a problem in that the grip force is deteriorated.

The bromine value refers to the number of grams of bromine added to the unsaturated component in 100 g of a sample. It means that the higher the bromine value, the higher the unsaturated component in the sample. The bromine value may be obtained by dissolving a sample in carbon tetrachloride, adding acetic acid, falling a standard mixed solution of potassium bromide-potassium bromate dropwise to cause a sufficient addition reaction from the free bromine, and then adding a potassium iodide solution to substitute excess bromine with iodine and inversely titrating this iodine in a standard sodium thiosulfate solution.

Preferably, the bromine value may be 1 to 50, more preferably 1 to 20, and most preferably 1 to 5. When the bromine value is less than 1, there may be a problem with the effect of improving grip force because there is no minimum unsaturated group required for mixing. When the bromine value is more than 50, the mixing and crosslinking of the rubber composition may be interfered to adversely affect rolling resistance properties.

The hydrogenated petroleum resin according to the present disclosure including the above-described repeating units may be required to be limited in the content of each repeating unit in order to ensure the improvement of tire performance characteristics such as rolling resistance, braking force, and abrasion resistance when the hydrogenated petroleum resin applied to a rubber composition for manufacturing a tire. This content range is a range for maximizing an effect to be obtained through the introduction of an aromatic monomer derived from the $C_9$ fraction, that is, an effect of improving the viscoelastic properties of rubber, while maintaining the basic physical properties of the petroleum resin itself. When the content of the repeating unit derived from the $C_9$ fraction is out of the range suggested by the present disclosure, the above-mentioned effects cannot be sufficiently secured because the molecular weight, degree of polymerization, content of aromatic hydrogen in the resin are changed.

Specifically, the hydrogenated petroleum resin may include the repeating unit (A) derived from the cyclic pentadiene component in an amount of more than 50 wt %, more preferably 52 wt % to 70 wt %, and most preferably 55 wt % to 65 wt %, based on 100 wt % of the total repeating units. When the content of the repeating unit (A) is less than 50 wt %, the content of the repeating unit (B) relatively increases, the softening point is lowered, so that when the hydrogenated petroleum resin introduced into the rubber composition, not only the viscoelastic properties of the rubber are lowered, but also the compatibility is greatly deteriorated. Conversely, when the content of the repeating unit (A) exceeds 70 wt %, the content of the repeating unit (B) is relatively reduced, so that the desired effect as described above cannot be secured, and thus the repeating unit (A) is appropriately used within the above range.

The hydrogenated petroleum resin may have a weight average molecular weight of 600 g/mol to 1000 g/mol, preferably 750 g/mol to 1000 g/mol, and may have an MMAP of 35° C. to 50° C., preferably 35° C. to 40° C. The molecular weight and MMAP are parameters that directly affect compatibility when the hydrogenated petroleum resin is introduced into the rubber composition, and may affect grip force and rolling resistance, and may secure an optimum effect if they have the above ranges.

The hydrogenated petroleum resin according to the present disclosure may be prepared by copolymerization of the above-described cyclic pentadiene component and $C_9$ fraction. In this case, the copolymerization may proceed as an addition polymerization reaction between double bonds present in each monomer.

The hydrogenated petroleum resin according to an embodiment of the present disclosure is prepared by the following steps:

(S1) mixing a cyclic pentadiene component and a $C_9$ fraction and performing thermal polymerization of the mixture to prepare a petroleum resin; and (S2) performing a hydrogenation reaction of the petroleum resin by a hydrogenation catalyst to prepare a hydrogenated petroleum resin.

Hereinafter, each step will be described in detail.

(S1) Thermal Polymerization Reaction Step

First, a cyclic pentadiene component and a $C_9$ fraction are mixed and thermally polymerized to prepare a petroleum resin.

In this case, the usable cyclic pentadiene component and $C_9$ fraction are as described above.

Particularly, in the petroleum resin of the present disclosure, the polymerization of the cyclic pentadiene component and the $C_9$ fraction is carried out through thermal polymerization, not catalytic polymerization.

When a certain level or more of heat is applied to the cyclic pentadiene component and the $C_9$ fraction, they themselves may form radicals to cause an initiation reaction, and a petroleum resin may be prepared through a continuous polymerization reaction between monomers. Since such thermal polymerization does not use an initiator, it is possible to solve the problems of an increase in cost due to the use of the initiator and purity of petroleum resin.

During the thermal polymerization, the $C_9$ fraction is used in an amount of 10 to 90 parts by weight, preferably 20 to 80 parts by weight, based on 100 parts by weight of the cyclic pentadiene component. The content of the $C_9$ fraction is related to the physical properties of the finally obtained petroleum resin, and when the content thereof is less than the above range, an intended effect cannot be secured by using the $C_9$ fraction too little. Conversely, when the content thereof exceeds the above range, the content of the cyclic pentadiene component is relatively reduced and the softening point of the finally prepared petroleum resin decreases, so that physical properties of the petroleum resin may be deteriorated.

The thermal polymerization is not particularly limited in the present disclosure, and bulk polymerization and solution polymerization may be used. Preferably, solution polymerization may be used.

For the solution polymerization, a solvent is used. When performing this step by solution polymerization, a cyclic pentadiene component is dissolved in a solvent to obtain a solution containing the cyclic pentadiene component, and the $C_9$ fraction is added to the obtained solution containing the cyclic pentadiene component, and thermal polymerization is performed.

In this case, in the present disclosure, the solvent is not limited as long as it sufficiently dissolves the above-described cyclic pentadiene component. For example, the solvent may be at least one selected from toluene, methylene chloride, hexane, xylene, trichlorobenzene, alkylbenzene, acetonitrile, dimethylformamide, N-methylpyrrolidone, dimethylacetamide, dimethylsulfoxide, gam ma-butyrolactone, furfural, acetone, and a mixture thereof.

The content of the solvent is possible as long as it can sufficiently dissolve the cyclic pentadiene component. For example, the solvent is used in an amount of 2 mol to 10 mol based on 1 mol of the cyclic pentadiene component.

In the present disclosure, the thermal polymerization is performed at a temperature at which the initiation and polymerization reactions of the cyclic pentadiene component and the $C_9$ fraction may sufficiently occur, and the temperature may be changed according to the kinds of the cyclic pentadiene component and the C9 fraction.

Preferably, the thermal polymerization is performed at 250° C. to 300° C., more preferably at 270° C. to 290° C., most preferably at 277° C. to 288° C., and the reaction time thereof is 0.5 hours to 4 hours, preferably 1 hour to 3 hours.

The temperature is directly related to the initiation and polymerization reactions. When the temperature is less than the above range, initiation does not occur. Conversely, when the temperature is more than the above range, the decomposition of the cyclic pentadiene component or the $C_9$ fraction as a raw material or the formation of gel occurs, and the polymerization rate is not easy to control.

Further, the reaction time is related to a yield. When the reaction time is less than the above range, the yield may be lowered. Conversely, when the reaction time is more than the above range, even if the reaction is carried out for a long time, there is no significant increase in the yield, which is uneconomical, so the reaction time is appropriately used within the above range.

Particularly, in the present disclosure, since the thermal polymerization of the cyclic pentadiene component and the $C_9$ fraction, a catalyst removal process, which is an essential process in a cationic catalyst method as a conventional petroleum resin method, may not be required, and particularly the yield may be improved to more than 5% compared to catalytic polymerization.

The petroleum resin obtained after the thermal polymerization is subjected to a concentration process.

The concentration process is a process for separating petroleum resin, unreacted products, and oligomers, which are by-products, and is carried out at high temperature and, if necessary, under high pressure.

The concentration process is directly related to the yield and softening point of the petroleum resin. As the temperature increases, the yield tends to decrease and the softening point tends to increase. However, when the temperature is too low, it is difficult to remove unreacted products and by-products, so that the purity of the petroleum resin is greatly reduced. Therefore, a degassing process should be performed under conditions where the yield decreases and the softening point does not increase.

In the present disclosure, preferably, the concentration process is performed for 1 minute to 10 minutes at a temperature range of 220° C. to 260° C., preferably 230° C. to 250° C. When the concentration process is performed at a temperature below the above range, as mentioned above, the purity of the petroleum resin decreases. Conversely, when the concentration process is performed at a temperature above the above range, the yield decreases and the softening point increases, so that the physical properties of the finally obtained petroleum resin are deteriorated. Therefore, the petroleum resin is appropriately used within the above range.

(S2) Hydrogenation Reaction Step

Next, a hydrogenation catalyst is added to the prepared petroleum resin and a hydrogenation reaction is performed to prepare a hydrogenated petroleum resin.

The hydrogenation reaction is a reaction in which hydrogen is added to a double bond present in a cyclic pentadiene component to form a single bond. Through this hydrogenation reaction, a hydrogenated petroleum resin in which all or some of the double bonds in the repeating unit (A) constituting the petroleum resin prepared from the above-described step disappears is prepared.

In the present disclosure, since the hydrogenation reaction proceeds by the addition of a hydrogenation catalyst and involves a high exothermic process, temperature control requirements are difficult and high pressure should be maintained. Preferably, the hydrogenation reaction may be performed for 0.5 hours to 4 hours at a temperature of 150° C. to 300° C. under a pressure of 50 bar to 150 bar, and more preferably may be performed for 1 hour to 3 hours at a temperature of 200° C. to 300° C. under a pressure of 70 bar to 100 bar.

When the temperature and pressure are less than the above range, the hydrogenation reaction may not be sufficiently performed. Conversely, when the temperature and pressure are more than the above range, the molecular structure may be destroyed by severe reaction conditions, so that the amount of the hydrogenation catalyst is appropriately controlled within the above range.

In this case, the used hydrogenation catalyst is not particularly limited in the present disclosure, and any known hydrogenation catalyst may be used. For example, the hydrogenation catalyst may be at least one selected from a nickel catalyst, a palladium catalyst, a cobalt catalyst, a platinum catalyst, and a rhodium catalyst. Preferably, as the hydrogenation catalyst, a palladium catalyst is used.

The hydrogenation catalyst is used at a molar ratio of 0.001 to 0.5, preferably 0.05 to 0.2, based on 1 mol of a petroleum resin monomer. When the hydrogenation catalyst is used in an amount of less than 0.001 mol based on 1 mol of the petroleum resin monomer, reactivity may be insufficient, and when the hydrogenation catalyst is used in an amount of more than 0.5 mol, it is not economical due to the use of a large amount of catalyst.

Another aspect of the present disclosure provides a rubber composition including the hydrogenated petroleum resin.

The hydrogenated petroleum resin may be included in an amount of 1 to 20 parts by weight, preferably 5 to 15 parts by weight, more preferably 7 to 12 parts by weight, based on 100 parts by weight of raw rubber. When the content of the hydrogenated petroleum resin is less than the above range, the effect of simultaneously improving rolling resistance and grip force cannot be expected. Conversely, when the content thereof more than the above range, in addition to the hassle of redesigning process conditions by lowering the viscosity of the rubber composition, processability may be deteriorated and mechanical properties such as tensile strength and hardness of the final product may be deteriorated, so the hydrogenated petroleum resin is appropriately used within the above range.

The rubber composition according to the present disclosure may further include at least one selected from raw rubber, a reinforcing agent, a silane coupling agent, a vulcanizing agent and a vulcanization accelerator as a composition, in addition to the hydrogenated petroleum resin.

The raw rubber is not particularly limited as long as it has an olefinic double bond (carbon-carbon double bond), and natural rubber, synthetic rubber, or a mixture thereof may be used as the raw rubber. For example, preferably, the raw rubber is at least one selected from natural rubber, butadiene rubber, nitrile rubber, silicone rubber, isoprene rubber, styrene-butadiene rubber (SBR), isoprene-butadiene rubber, styrene-isoprene-butadiene rubber, acrylonitrile-butadiene rubber (NBR), ethylene-propylene-diene Rubber, halogenated butyl rubber, halogenated isoprene rubber, halogenated isobutylene copolymer, chloroprene rubber, butyl rubber, and halogenated isobutylene-p-methylstyrene rubber.

Carbon black and silica may be used as the reinforcing agent.

The carbon black provides effects such as improvement in abrasion resistance, improvement in rolling resistance characteristics, and prevention of cracks due to ultraviolet rays (prevention of UV deterioration). The carbon black usable in the present disclosure is not particularly limited, and any carbon black commonly used in the technical field may be used. For example, as the carbon black, carbon black such as furnace black, acetylene black, thermal black, channel black, or graphite may be used. Further, the physical properties such as particle diameter, pore volume, and specific surface area of carbon black are not particularly limited, and various carbon blacks conventionally used in rubber industries, for example, SAF, ISAF, HAF, FEF, GPF, SRF (all, abbreviations of carbon black classified as ASTM standard D-1765-82a in the United States) may be appropriately used.

Preferably, the carbon black is included in an amount of 40 to 80 parts by weight, preferably 40 to 65 parts by weight, based on 100 parts by weight of the raw rubber. The carbon black is a reinforcing filler and is an essential element for rubber compounding. When the content of the carbon black is less than the above range, a reinforcing effect is degraded. On the contrary, when the content thereof more than the above range, dispersion is difficult.

Further, the silica used as a reinforcing agent for rubber can be used without particular limitation, and examples thereof may include dry white carbon, wet white carbon, synthetic silicate white carbon, colloidal silica, and precipitated silica. The specific surface area of silica is not particularly limited, but may be usually in the range of 40 $m^2/g$ to 600 $m^2/g$, preferably 70 $m^2/g$ to 300 $m^2/g$, and the primary particle diameter of silica may be 10 nm to 1000 nm. They may be used alone or in combination of two or more.

Preferably, the silica is included in an amount of 40 to 80 parts by weight, preferably 40 to 65 parts by weight, based on 100 parts by weight of the raw rubber. When the content of the silica is less than the above range, rolling resistance is high and thus fuel efficiency decreases. On the contrary, when the content exceeds the above range, a decrease in grip force may be caused. Therefore, the silica is appropriately used within the above range.

As the reinforcing agent, in addition to the carbon black and silica, powders of minerals such as clay and talc, carbonates such as magnesium carbonate and calcium carbonate, and alumina hydrates such as aluminum hydroxide may be used.

The silane coupling agent is used to blend silica.

Examples of the silane coupling agent may include vinyltrichlorosilane, vinyltriethoxysilane, vinyltris(β-methoxyethoxy)silane, β-(3,4-epoxycyclohexyl)-ethyltrimethoxysilane, 3-chloropropyltrimethoxysilane, 3-chloropropyltriethoxysilane, 3-mercaptopropyltrimethoxysilane, 3-mercaptopropyltriethoxysilane, bis(3-(triethoxysilyl)propyl)disulfide, bis(3-triethoxsilylpropyl)trisulfide, bis(3-(triethoxysilyl)propyl)tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercapto Ethyltrimethoxysilane, 2-mercaptoethyltriethoxysilane, 3-trimethoxysilylpropyl-N,N-dimethylthiocarbamoyltetrasulfide, 3-triethoxysilylpropyl-N, N-dimethylthiocarbamoyltetrasulfide, 2-triethoxysilylethyl-N, N-dimethylthiocarbamoyltetrasulfide, 3-trimethoxysilylpropylbenzothiazolyl tetrasulfide, 3-triethoxysilylpropylbenzolyltetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N, N-dimethylthiocarbamoyltetrasulfide, and dimethoxymethylsilylpropylbenzothiazolyltetrasulfide. They are used alone or in combination of two or more. Preferably, bis(3-(triethoxysilyl)propyl)tetrasulfide may be used.

The content of the silane coupling agent varies depending on the content of silica, and may preferably be 5 to 20 parts by weight based on 100 parts by weight of the raw rubber. When the content thereof is less than the above range, it is difficult to uniformly mix silica, and thus there is a problem that the physical properties of rubber may be deteriorated. On the contrary, when the silane coupling agent is used beyond the above range, gelation of the rubber may occur. Therefore, the silane coupling agent may be appropriately used within the above range.

The crosslinking agent may be used without particular limitation as long as it is usually used for crosslinking of rubber, and may be appropriately selected according to the rubber component and isobutylene polymer.

Examples of the crosslinking agent may include sulfur crosslinking agents such as sulfur, morpholine disulfide, and alkylphenol disulfide; and organic peroxide crosslinking agents such as cyclohexanone peroxide, methylacetoacetate peroxide, tert-butylperoxyisobutyrate, tert-butylperoxybenzoate, benzoyl peroxide, lauroyl peroxide, dicumyl peroxide, ditert-butyl peroxide, and 1,3-bis(tert-butylperoxyisopropyl)benzene.

The crosslinking agent is used in an amount of 0.1 to 5 parts by weight based on 100 parts by weight of the raw rubber. When the content of the crosslinking agent is less than the above range, it is difficult to manufacture a tire having desired physical properties (for example, abrasion resistance) due to insufficient crosslinking. On the contrary, when the content thereof exceeds the above range, the physical properties (for example, elasticity) of the tire are deteriorated due to excessive crosslinking. Therefore, the crosslinking agent may be appropriately used within the above range.

In addition to the crosslinking agent, the rubber composition for a tire tread according to the present disclosure includes a vulcanization accelerator or a vulcanization aid. The vulcanization accelerator or vulcanization aid is not particularly limited, and may be appropriately selected and used depending on the rubber component, isobutylene polymer, and crosslinking agent contained in the rubber composition. The "vulcanization" represents crosslinking through at least one sulfur atom.

Examples of the vulcanization accelerator may include thiuram-based accelerators such as trimethyl thiuram monosulfide, tetramethyl thiuram disulfide, and tetraethyl thiuram disulfide; thiazole-based accelerators such as 2-mercaptobenzothiazole and dibenzothiazyl disulfide; sulfenamide-based accelerators such as N-cyclohexyl-2-benzothiazylsulfenamide and N-oxydiethylene-2-benzothiazolylsulfenamide; aldehyde-amine-based accelerators such as n-butylaldehyde-aniline condensation products and butylaldehyde-monobutylamine condensation products; aldehyde-ammonia-based accelerators such as hexamethylenetetramine; and thiourea accelerators such as thiocarbanilide. When these vulcanization accelerators are blended, they may be used alone, or may be used in combination of two or more.

The content of the vulcanization accelerator is preferably 0.1 to 10 parts by weight based on 100 parts by weight of the raw rubber from the viewpoint of improving physical properties.

Examples of the vulcanization aid may include metal oxides such as zinc oxide (zincization) and magnesium oxide; metal hydroxides such as calcium hydroxide; metal carbonates such as zinc carbonate and basic zinc carbonate; aliphatic acids such as stearic acid and oleic acid; aliphatic metal salts such as zinc stearate and magnesium stearate; amines such as n-butylamine and dicyclohexylamine; and ethylene dimethacrylate, diallylphthalate, N,N-m-phenylenedimaleimide, triallyl isocyanurate, and trimethylolpropane trimethacrylate. When these vulcanization aids are blended, they may be used alone, or may be used in combination of two or more.

The content of the vulcanization aid is preferably 0.1 to 10 parts by weight based on 100 parts by weight of the raw rubber from the viewpoint of improving physical properties.

In addition, the rubber composition according to the present disclosure may contains one or two or more kinds of additives used in the field of the rubber industry, such as an anti-aging agent, a vulcanization retardant, a loosening agent, process oil, and a plasticizer. The blending amount of these additives is preferably 0.1 to 10 parts by weight based on 100 parts by weight of the raw rubber.

In addition, the present disclosure provides a rubber molded article manufactured from the rubber composition.

The rubber molded article according to an embodiment of the present disclosure may be a tire, preferably a tire tread. In this case, the rubber composition including the above-described composition is manufactured into a tire through a known method.

As an example, the rubber composition according to the present disclosure may be prepared by kneading the above components using a kneader such as a plaster mill, a Banbury mixer, a roll, or an internal mixer. Specifically, it is preferred that among the above components, components other than a crosslinking agent and a vulcanization accelerator are kneaded, and then a crosslinking agent and a vulcanization accelerator are added to the obtained kneaded product and further kneaded.

The rubber composition prepared by the above method may be used as a material constituting a tread portion (and a cap portion including the tread portion) contacting a road surface. According to the preparation method thereof, the rubber composition is extruded according to the shape of a tire to be formed (specifically, a tread shape), and is molded on a tire molding machine by a conventional method, thereby preparing an uncrosslinked molded product for tires. This uncrosslinked molded product for tires is heated and pressed in a vulcanizing machine to produce a tire tread, and this tire tread is assembled with other parts to manufacture a desired tire.

The tire manufactured in this way is excellent in mechanical properties (hardness, tensile strength, modulus, and the like), chip cutting resistance, and adhesion performance that must be possessed as a tire. In particular, this tire has high grip force (wet/dry), excellent driving stability and braking performance of a vehicle, and has low rolling resistance, thereby enabling high fuel efficiency of the vehicle.

Therefore, the rubber composition of the present disclosure is suitable as a rubber composition for obtaining treads of tires such as low-fuel-consumption tires and high-performance tires.

Hereinafter, the present disclosure will be described in more detail with reference to Examples. These Examples are only for describing the present disclosure in more detail, and it will be obvious to those skilled in the art that the scope of the present disclosure is not limited to these Examples.

Examples 1 to 11: Preparation of Petroleum Resins

Example 1

27 wt % of dicyclopentadiene (DCPD, Kolon Industries Co., Ltd., purity 80.21%) was dissolved in toluene as a solvent in a 1 L autoclave to make a mixture, and 23 wt % of $C_9$ fraction (styrene 20 wt %, indene 18 wt %, vinyl toluene 16 wt %, and α-methylstyrene 5 wt %) was added to the mixture, a reactor was connected to the autoclave, and then thermal polymerization was performed for 1 hour while maintaining reaction temperature at 279° C. and a reaction was terminated.

After the reaction was completed, the obtained product was put into a four-neck kettle and left in vacuum at room temperature. The vacuum degree was maintained at 10 torr, and the product was heated to 260° C. with stirring. Upon reaching 260° C., concentration time was counted and maintained for 10 minutes. When concentration was completed, vacuum was released in that state to obtain a molten petroleum resin.

Toluene as a hydrogenation solvent was added 1.5 times to the obtained petroleum resin to completely dissolve, and was introduced into the 1 L autoclave.

0.2 mol of a palladium catalyst was added thereto, a reactor was connected to the 1 L autoclave, and then a partial hydrogenation reaction was performed at a hydrogen pressure of 80 bar and a temperature of 275° C. for 90 minutes. After the reaction was completed, the reaction product was distilled at 260° C. for 10 minutes in a vacuum state of 10 torr to prepare a partially hydrogenated petroleum resin.

Examples 2 to 14

As described in Table 1 below, partially hydrogenated petroleum resins were prepared in the same manner as in Example 1, except that the contents of dicyclopentadiene, C9 fraction and toluene were changed, and the reaction temperature during thermal polymerization and the reaction temperature during hydrogenation were changed.

TABLE 1

|  |  | Example 1 | Example 2 | Example 3 | Example 4 | Example 5 | Example 6 | Example 7 |
|---|---|---|---|---|---|---|---|---|
| Blending ratio | DCPD(%) | 27 | 34 | 27 | 34 | 30.5 | 30.5 | 27 |
|  | C9(%) | 23 | 16 | 23 | 16 | 19.5 | 19.5 | 23 |
|  | Solvent(%) | 50 | 50 | 50 | 50 | 50 | 50 | 50 |
|  | Total(%) | 50 | 50 | 50 | 50 | 50 | 50 | 50 |
| Polymerization condition | Temperature (° C.) | 277 | 277 | 279 | 277 | 278 | 278 | 279 |
|  | Time (h) | 2 | 2 | 2 | 2 | 2 | 2 | 2 |
| Hydrogenation conditions | Temperature (° C.) | 275 | 270 | 270 | 265 | 275 | 270 | 275 |
|  | Time (h) | 1.5 | 1.5 | 1.5 | 1.5 | 1.5 | 1.5 | 1.5 |

|  |  | Example 8 | Example 9 | Example 10 | Example 11 | Example 12 | Example 13 | Example 14 |
|---|---|---|---|---|---|---|---|---|
| Blending ratio | DCPD(%) | 27 | 27 | 30.5 | 30.5 | 27 | 27 | 30.5 |
|  | C9(%) | 23 | 23 | 19.5 | 19.5 | 23 | 23 | 19.5 |
|  | Solvent(%) | 50 | 50 | 50 | 50 | 50 | 50 | 50 |
|  | Total(%) | 50 | 50 | 50 | 50 | 50 | 50 | 50 |
| Polymerization condition | Temperature (° C.) | 281 | 281 | 284 | 286 | 282 | 278 | 284 |
|  | Time (h) | 2 | 2 | 2 | 2 | 2 | 2 | 2 |
| Hydrogenation conditions | Temperature (° C.) | 270 | 275 | 275 | 280 | 220 | 275 | 280 |
|  | Time (h) | 1.5 | 1.5 | 1.5 | 1.5 | 1.5 | 1.5 | 1.5 |

Comparative Examples 1 to 12: Preparation of Petroleum Resins

As described in Table 2 below, partially hydrogenated petroleum resins were prepared in the same manner as in Example 1, except that the contents of dicyclopentadiene, C9 fraction and toluene were changed, and the reaction temperature during thermal polymerization and the reaction temperature during hydrogenation were changed.

Experimental Example 1: Evaluation Method of Resin Properties

The molecular weights, softening points, aromatic contents, MMAPs and bromine values of the petroleum resins according to Examples and Comparative Examples were measured. The measurement results of physical properties of the petroleum resins of Examples 1 to 14 are shown in Table 3 below, and the measurement results of physical properties

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Blending ratio | DCPD(%) | 34 | 34 | 44.5 | 30.5 | 34 | 34 |
|  | C9(%) | 16 | 16 | 5.5 | 19.5 | 16 | 16 |
|  | Solvent(%) | 50 | 50 | 50 | 50 | 50 | 50 |
|  | Total(%) | 50 | 50 | 50 | 50 | 50 | 50 |
| Polymerization condition | Temperature (° C.) | 265 | 265 | 261 | 267 | 268 | 272 |
|  | Time (h) | 2 | 2 | 2 | 2 | 2 | 2 |
| Hydrogenation condition | Temperature (° C.) | 275 | 275 | 275 | 275 | 275 | 275 |
|  | Time (h) | 1.5 | 1.5 | 1.5 | 1.5 | 1.5 | 1.5 |

|  |  | Comparative Example 7 | Comparative Example 8 | Comparative Example 9 | Comparative Example 10 | Comparative Example 11 | Comparative Example 12 |
|---|---|---|---|---|---|---|---|
| Blending ratio | DCPD(%) | 44.5 | 27 | 27 | 46 | 50 | 0 |
|  | C9(%) | 5.5 | 23 | 23 | 4 | 0 | 50 |
|  | Solvent(%) | 50 | 50 | 50 | 50 | 50 | 50 |
|  | Total(%) | 50 | 50 | 50 | 50 | 50 | 100 |
| Polymerization condition | Temperature (° C.) | 261 | 269 | 269 | 262 | 265 | 295 |
|  | Time (h) | 2 | 2 | 2 | 2 | 2 | 2 |
| Hydrogenation condition | Temperature (° C.) | 255 | 275 | 275 | 285 | 290 | 250 |
|  | Time (h) | 1.5 | 1.5 | 1.5 | 1.5 | 1.5 | 1.5 | of the petroleum resins of Comparative Examples 1 to 12 are shown in Table 4 below. The evaluation method of physical properties is as follows.

(1) Molecular Weight

The weight average molecular weight (Mw), number average molecular weight (Mn), and Z-average molecular weight (Mz) in terms of polystyrene were determined by gel permeation chromatography (manufactured by Hewlett-Packard, model name HP-1100). The polymer for measurement was dissolved in tetrahydrofuran to a concentration of 4000 ppm, and 100 μl of the solution was injected into GPC. The fluidized phase of GPC was introduced with tetrahydrofuran at a flow rate of 1.0 mL/min, and analysis was performed at 30° C. As a column, three PI gels (1,000 Å+500 Å+100 Å) of Agilent Corporation were connected in series. As a detector, an RI detector (HP-1047A, manufactured by Hewlett-Packard) was used to measure the molecular weights at 30° C.

(2) Measurement of Softening Point (° C.)

The softening point was measured using a ring and ball softening method (ASTM E 28). The resin was dissolved and introduced into a ring-shaped frame, the ring-shaped frame put into a beaker containing glycerin, and then the ring-shaped frame filled with the resin was heated at a temperature increase rate of 5° C./min to measure the temperature (softening point) when the resin melted and balls fell.

(3) Measurement of MMAP (Mixed Methylcyclohexane-Aniline Point, ° C.)

2 g of each of the resins prepared in Examples and Comparative Examples was put into a test tube. A methylcyclohexane solution was put into the test tube using a pipette and heated to dissolve. After confirming that the resin was melted, 4 g of an aniline solution was added and a cloud point was measured when the solution became cloudy.

(4) Measurement of Bromine Value (Bromine g/100 g)

After 0.5 g of each of the resins prepared in Examples and Comparative Examples was dissolved in 40 ml of cyclohexane, 50 ml of acetic acid was added, a standard mixed solution of potassium bromide-potassium bromate was titrated to cause an addition reaction in the free bromine. After the sufficient reaction, 5 ml of a potassium iodide solution was added to substitute excess bromine with iodine, and this iodine was inversely titrated with a standard sodium thiosulfate solution to measure a bromine value.

That is, the bromine value refers to an amount of bromine that reacts with a double bond. As the number of double bonds in the resin increases, the amount of reacting bromine increases, and thus the bromine value increases.

(5) Analysis of Aromatic Hydrogen Content (Mol %)

From the 1H-NMR spectrum result through nuclear magnetic resonance spectroscopy (500 NMR of Bruker Corporation, 14.1 tesla), the content of aromatic hydrogen in each of the hydrogenated petroleum resins prepared in Examples and Comparative Examples was calculated by the following equation.

$$\text{Aromatic hydrogen content (mol \%)} = \text{peak area of } 6.5 ppm \text{ to } 8.0 ppm \text{ in } ^1H\text{-}NMR spectrum / \text{total area in } ^1H\text{-}NMR * 100$$

TABLE 3

| Resin properties | Example 1 | Example 2 | Example 3 | Example 4 | Example 5 | Example 6 | Example 7 |
|---|---|---|---|---|---|---|---|
| Softening point | 100 | 115 | 100 | 115 | 115 | 115 | 115 |
| Aromatic hydrogen content | 12 | 8 | 12 | 8 | 10 | 10 | 12 |
| Bromine value | 1.5 | 3.0 | 3.0 | 4.5 | 1.5 | 3.0 | 1.5 |
| MMAP | 37 | 41.0 | 37.0 | 43 | 41 | 41.0 | 37 |
| Mn | 414 | 424 | 447 | 351 | 405 | 438 | 458 |
| Mw | 699 | 697 | 749 | 679 | 706 | 708 | 787 |
| Mz | 1312 | 1728 | 1544 | 1293 | 1416 | 1254 | 1747 |
| Equation 1 | 0.622 | 0.623 | 0.625 | 0.627 | 0.678 | 0.680 | 0.748 |
| Equation 2 | 136 | 139 | 136 | 139 | 145 | 145 | 151 |

| Resin properties | Example 8 | Example 9 | Example 10 | Example 11 | Example 12 | Example 13 | Example 14 |
|---|---|---|---|---|---|---|---|
| Softening point | 115 | 120 | 140 | 145 | 125 | 110 | 140 |
| Aromatic hydrogen content | 12 | 12 | 10 | 10 | 12 | 12 | 10 |
| Bromine value | 3 | 1.5 | 3 | 1.5 | 20 | 1.5 | 1.5 |
| MMAP | 40 | 39 | 49 | 41 | 41 | 36 | 49 |
| Mn | 440 | 462 | 513 | 565 | 485 | 430 | 512 |
| Mw | 780 | 794 | 840 | 958 | 833 | 765 | 838 |
| Mz | 1627 | 1763 | 2015 | 2153 | 1851 | 1648 | 2010 |
| Equation 1 | 0.751 | 0.794 | 0.929 | 0.982 | 1.001 | 0.704 | 0.927 |
| Equation 2 | 151 | 156 | 170 | 175 | 161 | 146 | 170 |

TABLE 4

| Resin properties | Comparative Example 1 | Comparative Example 2 | Comparative Example 3 | Comparative Example 4 | Comparative Example 5 | Comparative Example 6 |
|---|---|---|---|---|---|---|
| Softening point | 85 | 85 | 100 | 85 | 100 | 100 |
| Aromatic hydrogen content | 8 | 8 | 2 | 10 | 8 | 8 |
| Bromine value | 1.5 | 3.0 | 1.8 | 3 | 1.5 | 3 |
| MMAP | 40 | 40.0 | 56 | 39 | 43 | 41 |
| Mn | 307 | 310 | 280 | 354 | 342 | 337 |
| Mw | 564 | 569 | 540 | 686 | 654 | 604 |
| Mz | 1184 | 1195 | 910 | 1560 | 1052 | 1188 |
| Equation 1 | 0.386 | 0.388 | 0.398 | 0.446 | 0.494 | 0.497 |
| Equation 2 | 109 | 109 | 106 | 115 | 124 | 124 |

| Resin properties | Comparative Example 7 | Comparative Example 8 | Comparative Example 9 | Comparative Example 10 | Comparative Example 11 | Comparative Example 12 |
|---|---|---|---|---|---|---|
| Softening point | 100 | 85 | 85 | 125 | 160 | 115 |
| Aromatic hydrogen content | 2 | 12 | 12 | 0 | 0 | 45 |
| Bromine value | 16 | 3.0 | 4.5 | 0.3 | 3 | 1.8 |
| MMAP | 54 | 37.0 | 37 | 74 | 81 | 0 |
| Mn | 285 | 448 | 452 | 240 | 320 | 728 |
| Mw | 541 | 748 | 755 | 500 | 550 | 1821 |
| Mz | 915 | 1381 | 1394 | 950 | 1040 | 4268 |
| Equation 1 | 0.499 | 0.516 | 0.521 | 0.610 | 1.004 | 3.758 |
| Equation 2 | 106 | 121 | 121 | 125 | 160 | 250 |

As given in Tables 3 and 4, in the case of the hydrogenated petroleum resins prepared according to Examples 1 to 14, the following Equation 1 was satisfied.

$$0.610 < \frac{x^2}{a} + \frac{y^2}{b} + \frac{z^2}{c} < 1.004 \quad \text{[Equation 1]}$$

In Equation 1, x is a softening point (° C.), y is an aromatic hydrogen content (mol %), z is a bromine value, and a=25600, b=625, and c=2500.

In the case of the hydrogenated petroleum resins prepared according to Examples 1 to 14, it was found that the softening point is 100° C. to 150° C., the aromatic hydrogen content is 8.0 mol % to 14.0 mol %, and the bromine value is 1 to 20. In addition, In the case of the hydrogenated petroleum resins prepared according to Examples 1 to 14, it was found that the weight average molecular weight is 600 g/mol to 1000 g/mol, and MMAP is 35° C. to 50° C.

On the other hand, in the case of the hydrogenated petroleum resins prepared according to Comparative Examples 1 to 12, the above Equation 1 is not satisfied. In Comparative Examples 1 to 9, the calculated value according to Equation 1 is 0.610 or less, and in Comparative Examples 11 to 12, the calculated value according to Equation 1 is 1.004 or more.

Meanwhile, unlike Examples 1 to 6 and 13 and Comparative Examples 1 to 12, in the case of Examples 7 to 12 and 14, both Equation 1 and Equation 2 above are satisfied.

$$151 \leq x + 3y \leq 175 \quad \text{[Equation 2]}$$

In Equation 2, x is a softening point (° C.), and y is an aromatic hydrogen content (mol %).

Further, unlike Examples 1 to 9 and 13 and Comparative Examples 1 to 12, in the case of Examples 10 to 12 and 14, both Equation 1 and Equation 2 above are satisfied, and Equation 1-1 is satisfied.

$$0.920 < \frac{x^2}{a} + \frac{y^2}{b} + \frac{z^2}{c} < 1.004 \quad \text{[Equation 1]}$$

In Equation 1-1, x is a softening point (° C.), y is an aromatic hydrogen content (mol %), z is a bromine value, and a=25600, b=625, and c=2500.

Experimental Example 2: Measurement of Physical Properties of Tire

Preparation of Tire Tread 2 parts by weight of a dispersant (product name: 40 MS, STRUKTOL), 25 parts by weight of carbon black, 25 parts by weight of silica, 5 parts by weight of a silane coupling agent, 2 parts by weight of stearic acid, 3 parts by weight of zinc oxide, 2 parts by weight of sulfur, 1.5 parts by weight of n-cyclohexyl benzothiazyl-2-sulfide (TBBS, Miwon chem.), 1 part by weight of DPG, and 10 parts by weight of each of the hydrogenated petroleum resins of Examples and Comparative Examples were added to 100 parts by weight of rubber obtained by mixing styrene-butadiene rubber (product name: SSBR-3323, Kumho Petrochemical) and butadiene rubber (product name: BR-01, Kumho Petrochemical) in a ratio of 11:2, and a compound work was performed in a Banbury mixer.

Then, a compound sheet was prepared using an open mill. The compound sheet was vulcanized at 160° C. for 20 minutes to prepare a rubber specimen for test.

Measurement of Physical Properties of Tire

The loss coefficient (Tan δ) of the rubber specimen including each of the hydrogenated petroleum resins of Examples and Comparative Examples related to grip force (Wet Grip, W/G) and rolling resistance (R/R) at 11 Hz was measured using dynamic mechanical analysis (Model: TA-DMA Q800), and the results thereof are given in Tables 5 and 6 below. In this case, it means that the higher the tan δ (0° C.) value, the better the grip force, and the lower the tan δ (70° C.) value, the better the rolling resistance characteristics.

Each of the tan δ (0° C.) value of 0.5855 and the tan δ (70° C.) value of 0.06905 in Comparative Example 1 were set to 100. Based on the set value, the tan δ values of Examples 1 to 12 and Comparative Examples 2 to 12 were calculated. For example, the tan δ (0° C.) value of Example 1 is 0.5855×101%=0.5914, and the tan δ (70° C.) value of Example 1 is 0.06905×96%=0.06629.

the rubber composition is large, and the meaning that the wet grip force is excellent means that the loss coefficient (tan δ) measured at a frequency of 10 Hz to 100 Hz and about 0° C. by the dynamic viscoelasticity test of the rubber composition is large.

The rolling resistance (R/R) is expressed by the loss coefficient (tan δ) measured at a frequency of 10 Hz to 100 Hz at about 70° C. by the dynamic viscoelasticity test of the rubber composition, and the smaller the loss coefficient, the better the rolling resistance. That is, the meaning that the rolling resistance is excellent means that the loss coefficient (tan δ) measured at a frequency of 10 Hz to 100 Hz and about 70° C. by the dynamic viscoelasticity test of the rubber composition is small.

In this case, tan δ (0° C.), tan δ (25° C.), and tan δ (70° C.) are values moving in the same tendency. Preferably, rolling resistance (R/R, tan δ (70° C.)) or wet grip force (tan δ (0° C.)) should be improved in a stage where the softening point is maintained at the same or similar level. Ideally, it is preferred that the rolling resistance decrease, and the wet grip force increases. However, since rolling resistance and wet grip force are in a complementary relationship, it is not easy to improve both physical properties. Therefore, it may be most ideal to increase the wet grip while substantially maintaining the rolling resistance or decreasing the rolling resistance to a minimum.

As shown in Tables 5 and 6 above, examining the grip force of Examples 1 to 14, particularly the tan δ (0° C.) value, which is a loss coefficient related to the wet grip force,

TABLE 5

| Tire properties | Example 1 | Example 2 | Example 3 | Example 4 | Example 5 | Example 6 | Example 7 |
|---|---|---|---|---|---|---|---|
| W/G | 101 | 102 | 103 | 103 | 104 | 105 | 109 |
| R/R | 96 | 96 | 102 | 97 | 103 | 102 | 99 |
| Grip force/ rolling resistance | 1.05 | 1.06 | 1.01 | 1.06 | 1.01 | 1.03 | 1.10 |

| Tire properties | Example 8 | Example 9 | Example 10 | Example 11 | Example 12 | Example 13 | Example 14 |
|---|---|---|---|---|---|---|---|
| W/G | 112 | 114 | 117 | 119 | 121 | 108 | 117 |
| R/R | 100 | 102 | 103 | 103 | 105 | 100 | 105 |
| Grip force/ rolling resistance | 1.12 | 1.12 | 1.14 | 1.15 | 1.16 | 1.08 | 1.11 |

TABLE 6

| Tire properties | Comparative Example 1 | Comparative Example 2 | Comparative Example 3 | Comparative Example 4 | Comparative Example 5 | Comparative Example 6 |
|---|---|---|---|---|---|---|
| W/G | 100 | 99 | 99 | 97 | 97 | 96 |
| R/R | 100 | 99 | 105 | 97 | 92 | 95 |
| Grip force/ rolling resistance | 1 | 1 | 0.94 | 1 | 0.96 | 1.05 |

| Tire properties | Comparative Example 7 | Comparative Example 8 | Comparative Example 9 | Comparative Example 10 | Comparative Example 11 | Comparative Example 12 |
|---|---|---|---|---|---|---|
| W/G | 95 | 93 | 92 | 90 | 97 | 95 |
| R/R | 93 | 97 | 110 | 99 | 123 | 99 |
| Grip force/ rolling resistance | 1.01 | 1.02 | 0.96 | 0.84 | 0.91 | 0.79 |

In general, the grip force is involved in brake braking and is expressed by the loss coefficient (tan δ) measured at a frequency of 10 Hz to 100 Hz at about 0° C. and 25° C. by a dynamic viscoelasticity test, and the larger the loss coefficient, the better the brake braking performance. The meaning that the dry grip force is excellent means that the loss coefficient (tan δ) measured at a frequency of 10 Hz to 100 Hz and about 25° C. by the dynamic viscoelasticity test of it may be found that the grip force of Examples 1 to 14 higher than that of Comparative Examples, and thus the grip force of the rubber composition may be improved when the rubber composition includes the hydrogenated petroleum resin of the present disclosure. Particularly, it was confirmed that the tan δ (0° C.) values of Examples 8 to 12, which correspond to the most preferred embodiments, have very excellent values exceeding 110, and the tan δ (0° C.) values of all of the other examples except these Examples also exceed 100.

Meanwhile, in the case of the value of tan δ (70° C.), which is a loss coefficient related to rolling resistance, the tan δ (70° C.) value of each of the rubber compositions of Examples 1 to 14 somewhat increases according to the improvement of grip force, which is a level similar to the rubber that is commonly and universally used in the current industry. Thus, it may be found that it is possible to effectively lower an increase rate of rolling resistance due to an increase in grip force resulting from the usage of the hydrogenated petroleum resin of the present disclosure.

On the other hand, in the case of Comparative Examples 1 to 12, it may be found that most of the values of tan δ (0° C.), which is a loss coefficient related to grip force, have a value less than 100, and most of the values of tan δ (70° C.), which is a loss coefficient related to rolling resistance, have a value equal to or higher than that of Examples.

Meanwhile, in the case of Examples 1 to 14, as the result value of Equation 1 increases, the value of tan δ (0° C.) increases in proportion. However, in the case of Comparative Examples 1 to 10 where the result value of Equation 1 is 0.610 or less, contrary to the case of Examples, as the result value of Equation 1 increases, the value of tan δ (0° C.) decreases in inverse proportion. Further, even in the case of Comparative Examples 11 and 12 where the calculated value of Equation 1 is 1.004 or more, contrary to the case of Examples, as the calculated value of Equation 1 increases, the value of tan δ (0° C.) decreases in inverse proportion. Further, it may be found that the value of tan δ (0° C.) rapidly decreases based on the range of Equation 1.

Meanwhile, In the case of Examples 7 to 12 satisfying Equations 1 and 2, it may be found that the loss coefficient tan δ (0° C.) related to grip force has a value more than 110% compared to the loss coefficient tan δ (70° C.) related to rolling resistance.

In the case of Examples 10 to 12 satisfying all of Equations 1, 1-1 and 2, it may be found that the tan δ (0° C.) not only has a value of 114% or more of the tan δ (70° C.), but also has a very high value, and thus very excellent grip force and low rolling resistance are exhibited.

From these results, it may be found that the rubber composition including the hydrogenated petroleum resin according to the present disclosure has an effect of simultaneously satisfying excellent grip force and rolling resistance.

Accordingly, the hydrogenated petroleum resin according to the present disclosure not only improves the viscoelastic properties of the rubber containing the same, but also has excellent compatibility with the rubber, thereby improving the overall physical properties of the rubber. Thus, a rubber molded article manufactured from a rubber composition containing the hydrogenated petroleum resin, such as a tire, may simultaneously satisfy fuel efficiency performance, braking performance, and durability performance, thereby enhancing product competitiveness as a high-performance tire.

The above-described Examples and Comparative Examples are examples for explaining the present disclosure, and the present disclosure is not limited thereto. Since those skilled in the art will be able to implement the present disclosure by various modifications therefrom, the scope of technical protection of the present disclosure should be defined by the attached claims.

The invention claimed is:

1. A hydrogenated petroleum resin comprising:
a repeating unit (A) derived from a cyclic pentadiene component; and
a repeating unit (B) derived from a $C_9$ fraction, wherein the $C_9$ fraction includes indene, styrene, vinyltoluene, and α-methylstyrene,
wherein the hydrogenated petroleum resin includes the repeating unit (A) derived from the cyclic pentadiene component in an amount of more than 50 wt % based on 100 wt % of the total repeating units, and
wherein the hydrogenated petroleum resin satisfies Equation 1 and Equation 2:

$$0.610 < \frac{x^2}{a} + \frac{y^2}{b} + \frac{z^2}{c} < 1.004 \qquad [\text{Equation 1}]$$

$$150 \le x + 3y \le 175 \qquad [\text{Equation 2}]$$

wherein, in Equations 1 and 2,
x is a softening point (° C.),
y is an aromatic hydrogen content (mol %),
z is a bromine value, and
a=25600, b=625, and c=2500.

2. The hydrogenated petroleum resin of claim 1, wherein the cyclic pentadiene component includes at least one selected from cyclopentadiene, dicyclopentadiene, and dimethyl cyclopentadiene.

3. The hydrogenated petroleum resin of claim 1, wherein the $C_9$ fraction includes at least one selected from unsaturated aromatic $C_8$, $C_9$, and $C_{10}$ fractions that has a boiling point range of 100° C. to 300° C. under atmospheric pressure.

4. The hydrogenated petroleum resin of claim 1, wherein the $C_9$ fraction further includes benzene/toluene/xylene.

5. The hydrogenated petroleum resin of claim 1, wherein the hydrogenated petroleum resin satisfies Equation 1-1:

$$0.920 < \frac{x^2}{a} + \frac{y^2}{b} + \frac{z^2}{c} < 1.004 \qquad [\text{Equation 1-1}]$$

wherein, in Equation 1-1,
x is a softening point (° C.),
y is an aromatic hydrogen content (mol %),
z is a bromine value, and
a=25600, b=625, and c=2500.

6. The hydrogenated petroleum resin of claim 1, wherein the softening point of the hydrogenated petroleum resin is 100° C. to 150° C.

7. The hydrogenated petroleum resin of claim 1, wherein the hydrogenated petroleum resin includes 6.0 mol % to 14.0 mol % of aromatic hydrogen based on the total number of moles of hydrogen in the resin.

8. The hydrogenated petroleum resin of claim 1, wherein the bromine value of the hydrogenated petroleum resin is 1 to 50.

9. The hydrogenated petroleum resin of claim 1, wherein the hydrogenated petroleum resin has a weight average molecular weight (Mw) of 600 g/mol to 1000 g/mol, and has a mixed methylcyclohexane-aniline point (MMAP) of 35° C. to 50° C.

10. A method of preparing the hydrogenated petroleum resin of claim 1, the method comprising:
(S1) mixing a cyclic pentadiene component and a $C_9$ fraction and performing thermal polymerization to prepare a petroleum resin, wherein the $C_9$ fraction includes indene; and
(S2) performing a hydrogenation reaction of the petroleum resin with a hydrogenation catalyst to prepare a hydrogenated petroleum resin.

11. The method of claim 10, wherein the $C_9$ fraction further includes at least one selected from styrene, vinyltoluene, α-methylstyrene, and benzene/toluene/xylene.

12. The method of claim 10, wherein, in the step (S1), 10 parts by weight to 90 parts by weight of the $C_9$ fraction is mixed with 100 parts by weight of the cyclic pentadiene component.

13. The method of claim 10, wherein the step (S1) is performed at a temperature of 250° C. to 300° C. for 0.5 hours to 4 hours.

14. The method of claim 10, wherein the step (S1) is performed at a temperature of 150° C. to 300° C. under a pressure of 50 bar to 150 bar.

15. The method of claim 10, wherein the hydrogenation catalyst is at least one selected from nickel, palladium, cobalt, platinum and rhodium catalysts.

16. A rubber composition for tire treads, comprising: the hydrogenated petroleum resin of claim 1; and raw rubber.

17. The rubber composition for tire treads of claim 16, further comprising:
at least one selected from a reinforcing agent, a silane coupling agent, a vulcanizing agent, and a vulcanization accelerator.

18. The rubber composition for tire treads of claim 16, wherein the hydrogenated petroleum resin is included in an amount of 1 part by weight to 20 parts by weight based on 100 parts by weight of the raw rubber.

\* \* \* \* \*